United States Patent [19]
Kasai

[11] Patent Number: 6,024,014
[45] Date of Patent: Feb. 15, 2000

[54] PORTABLE REVERSIBLE GRILL WITH IMPROVED FLUID DRAINAGE

[75] Inventor: Masahiro Kasai, Hong Kong, The Hong Kong Special Administrative Region of the People's Republic of China

[73] Assignee: Hiraoka & Co. ( H.K. ) , Ltd., Kowloon, The Hong Kong Special Administrative Region of the People's Republic of China

[21] Appl. No.: 09/260,598

[22] Filed: Mar. 2, 1999

[51] Int. Cl.[7] ...................................................... A47J 37/10
[52] U.S. Cl. ................................ 99/425; 99/400; 99/445; 99/446
[58] Field of Search ............................... 99/422–425, 375, 99/400, 401, 444–447, 449, 450; 126/41 R, 390, 383; 219/386, 439, 520, 521, 430, 455

[56] References Cited

U.S. PATENT DOCUMENTS

| | | | |
|---|---|---|---|
| 1,733,450 | 10/1929 | Detwiler | 99/425 |
| 2,198,647 | 4/1940 | Wolcott | 99/425 |
| 3,678,844 | 7/1972 | Marshall | 99/340 |
| 5,355,779 | 10/1994 | O'Brien | 99/446 |
| 5,546,851 | 8/1996 | Goto | 99/446 |
| 5,845,562 | 12/1998 | Deni | 99/400 |
| 5,884,555 | 3/1999 | Chang | 99/425 |

*Primary Examiner*—James C. Yeung
*Attorney, Agent, or Firm*—Moonray Kojima

[57] ABSTRACT

A portable reversible grill apparatus wherein a grill plate having a cordoroy surface on one side and a flat surface on the other with openings in the periphery thereof is removably and firmly held on top of a base wherein a removable pan is held to catch any fluid leaking from food being cooked on the grill plate and passing through the openings in the periphery of the grill plate. Advantageously, the apparatus can be readily and easily assembled and disassembled with the base, pan and grill plate being separable from each other for washing.

7 Claims, 7 Drawing Sheets

PORTABLE REVERSIBLE GRILL WITH IMPROVED FLUID DRAINAGE

BACKGROUND OF THE INVENTION

1. Field of Invention

This invention relates to a portable grill apparatus and more particularly to such an apparatus wherein a reversible grill plate is provided having an improved drainage system.

2. Description of the Prior Art

Portable electric grills are known in the art, wherein the grill plate has a plurality of cross bars with holes therebetween so that when food is grilled on top thereof, fat and other fluids will fall through the holes. This tends to cause smoking which is not acceptable when the grill is used indoors.

Another type uses a reversible grill plate with a channel along the periphery for collect the fluid there at. But, the problem with that type is that the fluid will be at the same constant temperature as the grilling surface temperature so that smoking again results.

SUMMARY OF THE INVENTION

Accordingly, an object of the invention is to overcome the aforementioned and other deficiencies, disadvantages and problems of the prior art.

A further object is to provide a grill apparatus having a removable reversible grill plate which removably fits on top of a base which has a ledge therein to hold a removable pan therein to catch any fluid leaking through holes provided along a periphery of the grill plate so that the fluid is reduced in temperature as it accumulates in the periphery, then falls through the holes to be further reduced in temperature, and then is caught by the removable pan which is disposed below the holes of the grill plate and then the fluid is further reduced in temperature in the pan. Thus, advantageously, smoking of the fluid is reduced or completely eliminated.

Advantageously, the grill plate comprises an electric heating element embedded therein so that the plate is waterproof and completely washable. Similarly, the pan is readily removable from the base and washable. The base can also be washed separately from the grill plate and pan. Thus, the invention has resolved simultaneously various problems of the prior art such as build up of fat and other fluids causing difficult in cleaning, and unwanted smoking of the fluids.

Also, the base is constructed so as to be open on both the top and bottom and has legs and vertical walls with a ledge for holding the pan disposed inside the vertical walls. Thus, air cooling is enhanced and heat build up within the base is substantially eliminated. Also, the tops of the walls of the base are cut-out a the front and rear thereof so that space is provided between the grill plate and the wall tops so that air cooling is provided therebetween and heat build up is eliminated.

DETAILED DESCRIPTION OF THE PREFERRED EMBODIMENTS

Figure 1:
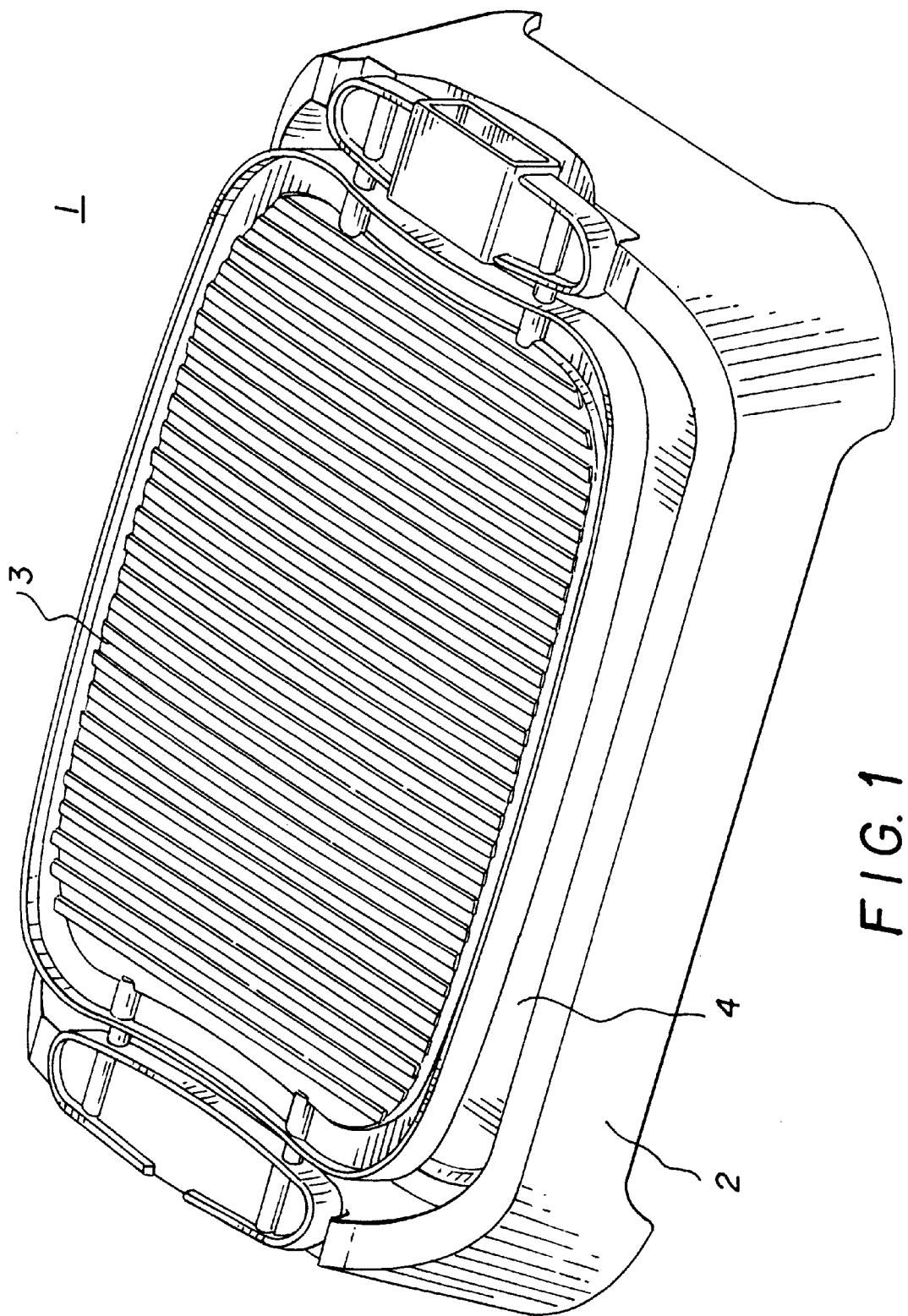
FIG. 1 is a perspective view depicting an illustrative embodiment of the invention.

FIG. 1 shows an illustrative portable electric grill apparatus 1 comprising a base 2, and a grill plate or unit 3 movably and firmly held on top of base 2. The entire grill apparatus 1 can be assembled and disassembled quickly and easily for washing of the individual components thereof. That is, grill plate or unit 3 is easily and conveniently removably and firmly fitted on top of base 2 and pan 4 is similarly firmly fitted on ledge 22 (see FIG. 2) within base 2. Hence, each of these units can be separated from each other and washed separately. In this way, fat or other accumulated fluids can be readily removed without much effort.

Figure 2:
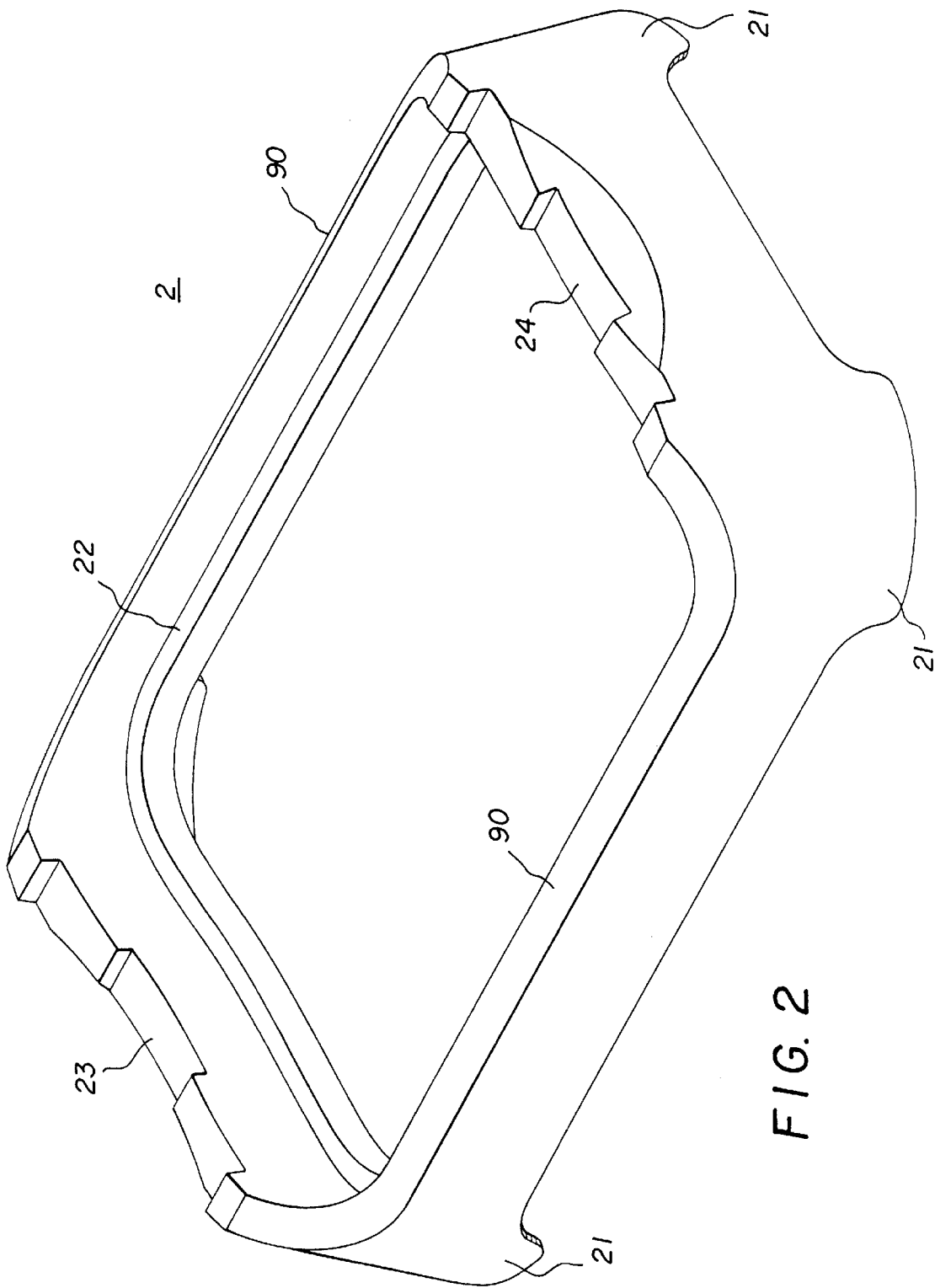
FIG. 2 is a perspective view depicting the base of the embodiment of FIG. 1.

FIG. 2 shows base 2 comprising a plurality (e.g. 4) of legs, a ledge 22 molded or otherwise formed around the inside of the vertical walls of base 2, and a cut-away channel 23,24 located at the respective ends of the tops of base 2 for firmly and removably holding within channels 23,24, the extensions 32 and 31 (see FIG. 6) of the grill plate 3. The channels 23,24 are formed in such a manner that the extensions 32 and 31 are firmly held thereby and so that the grill plate 3 will not move, such as when cooking is in progress, thereby insuring the safety of the operator. The legs 21 are located in a vertical position which enables the bottom 41 of the pan 4 (see FIG. 3) to be vertically higher than the bottom of legs 21. In that manner, further safety is assured so that pan 4 will not touch the table or other surface on which the grill apparatus 1 is placed for cooking.

The side walls of the base are also cut (see item number 90 in FIG. 5) to provide a vertical spacing between the grill unit 3 and the base 2 and thus provide air space for cooling. (see arrow "A" in FIG. 5). The base may comprise any suitable material, such as phenol or resin plastic.

Figure 3:
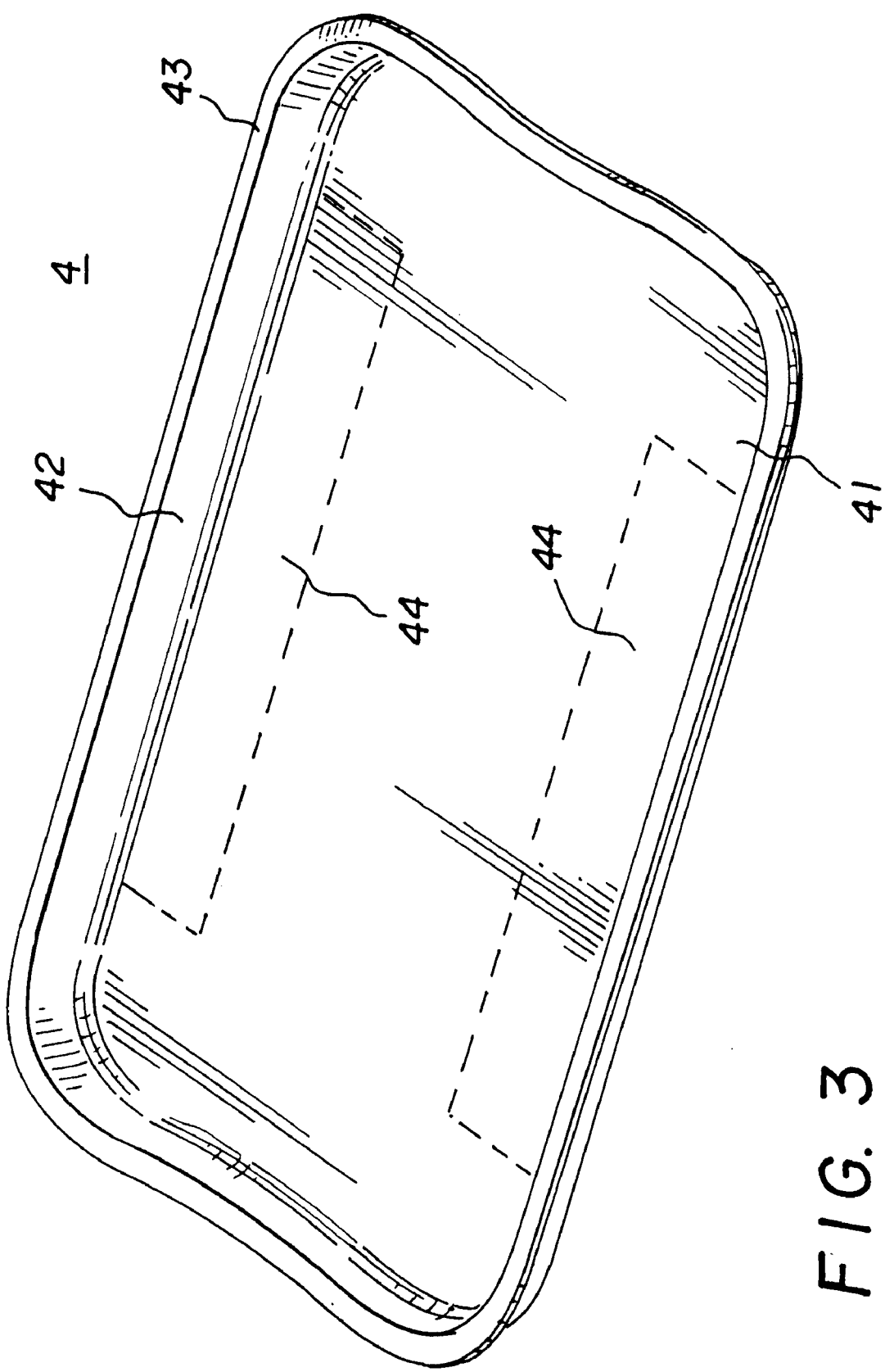
FIG. 3 is a perspective view depicting a fluid retaining pan which can be removably disposed in the base of FIG. 2.

FIG. 3 shows a closed bottom pan 4 comprising a flat bottom 41, walls 42, and at the top thereof a lip 43 extending around the entire periphery thereof. The lip 43 is of appropriate dimension to be firmly and removably held by ledge 22 (see FIG. 2) of the base 2. The pan may comprise any suitable material, such as resin or other plastic material. Advantageously, the inside of the pan 4 may be flat and the fluid caught therein spread evenly throughout the inside bottom surface. On the other hand, alternatively, the pan inside surface may be formed in sections 44 so that the fluid will be caught only in the bottom surface section 44 and the remainder of the bottom surface of pan 4 will be free of fluid. The sections 44 are shown symbolically in FIG. 3 with dotted lines and can be either present or be absent as desired. The sections 44 are located in pan 4 in such a manner that when the pan 4 is disposed below the grill plate 3, the holes 39 (see FIG. 6) will be directly above sections 44 so that fluid dropping through holes 39 will collect in the sections 44.

Figure 4:
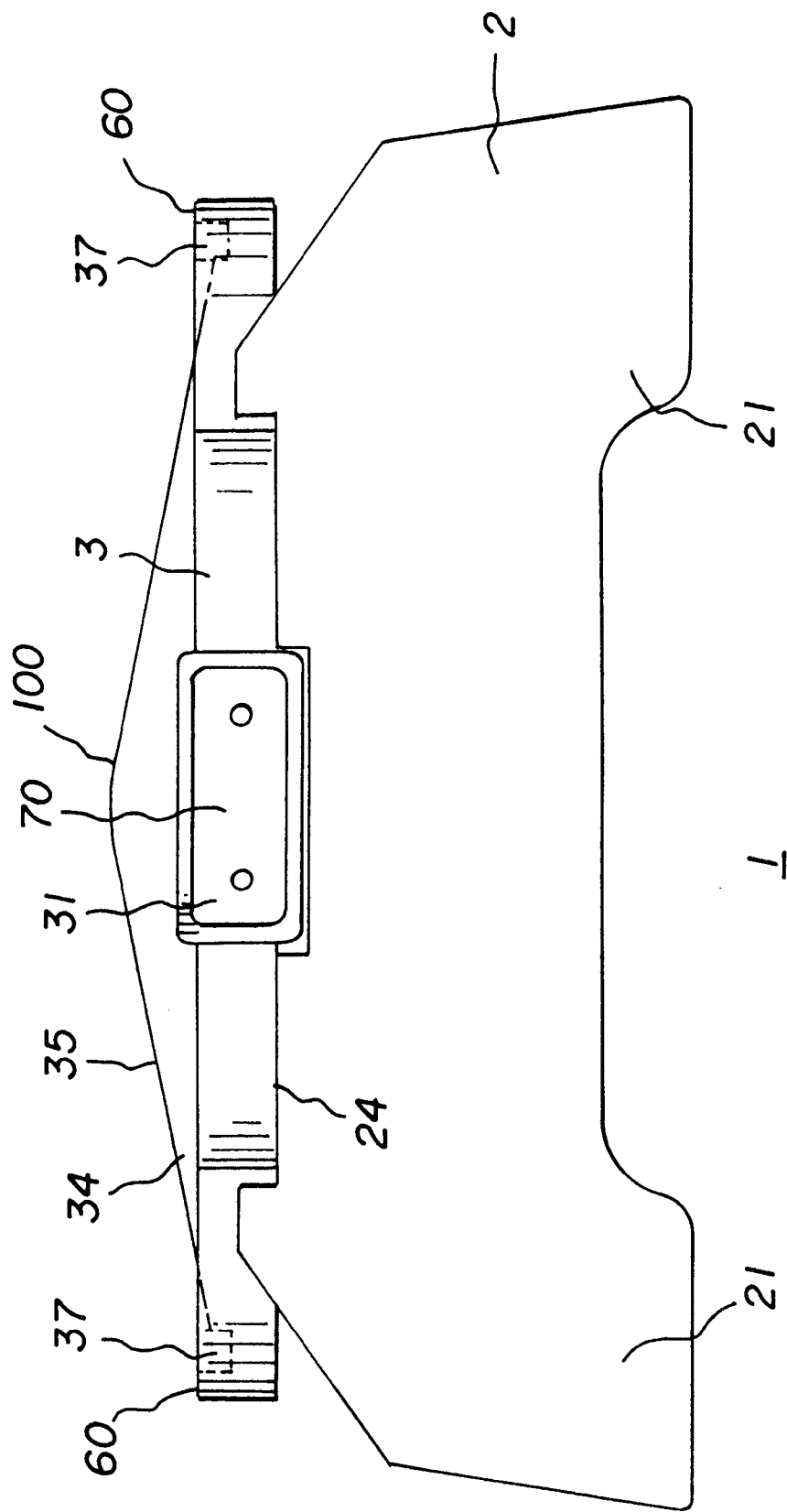
FIG. 4 is a right end view depicting the embodiment of FIG. 1 with the grill plate disposed on the base.
Figure 7:
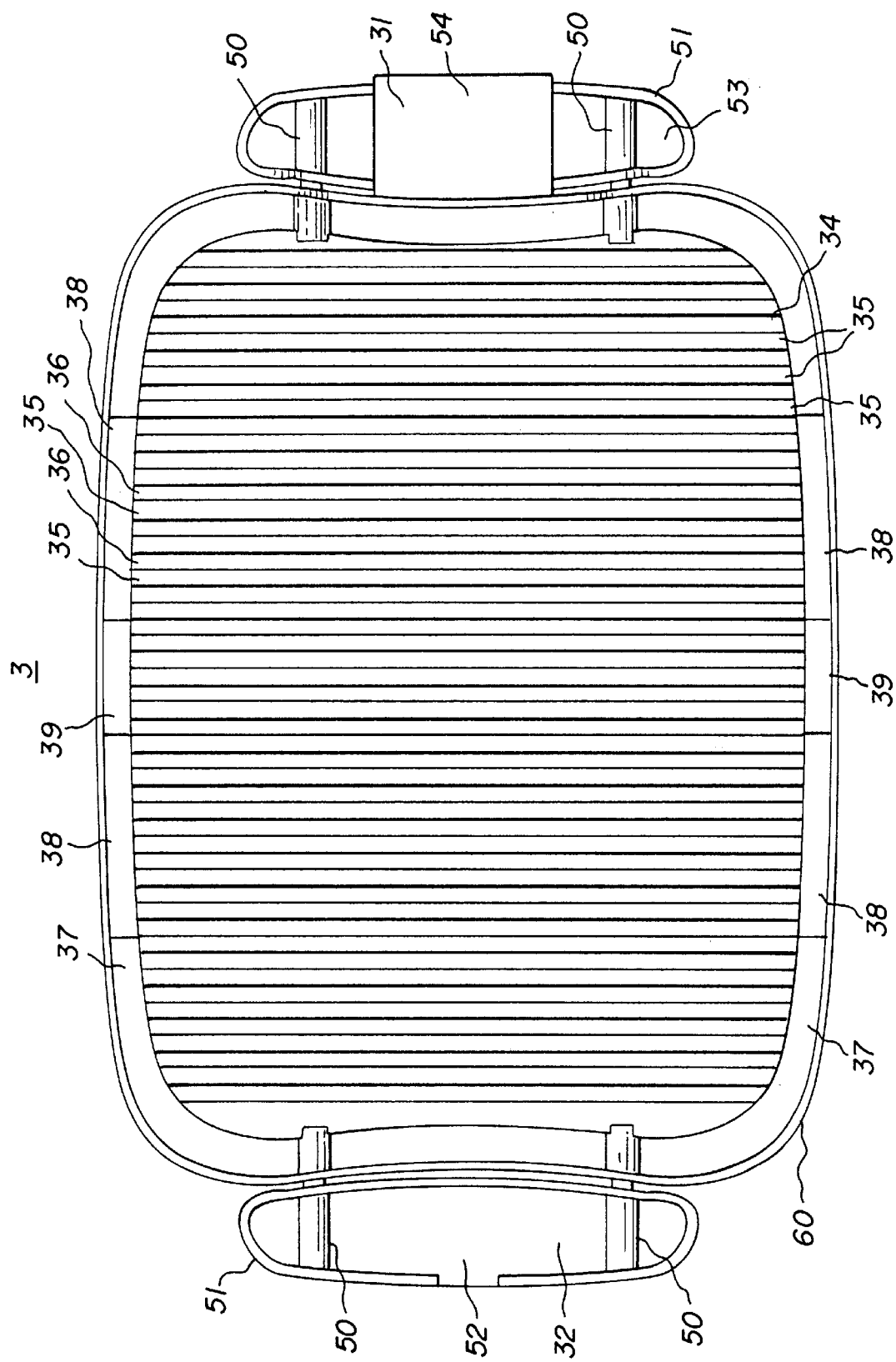
FIG. 7 is a top view depicting a cordoroy surface of the grill plate of FIG. 6, which is on the reverse side of the flat surface shown in FIG. 6.

FIG. 4 shows a right end or side view of the grill apparatus 1 wherein the base 2 is shown supporting the grill plate 3 with the right end extension 31 which comprises an electric coupling 70. The grill plate 3 has a cordoroy surface 34 (comprising bars 35 alternating with channels 36, such as shown in FIG. 7) which is slightly angled from the center 100 thereof, to the channel 37 located inside the periphery 60 of the grill unit 3. The upper surface of base 2 is formed by molding or cut-outs at ends thereof in a manner suitable for holding firmly and removably the extensions 31 and 32 of the grill unit 3. The cut-outs at the ends of the upper part of base 2 are labelled as 23 and 24, with the cut-out for this FIG. being numbered 24.

Figure 5:
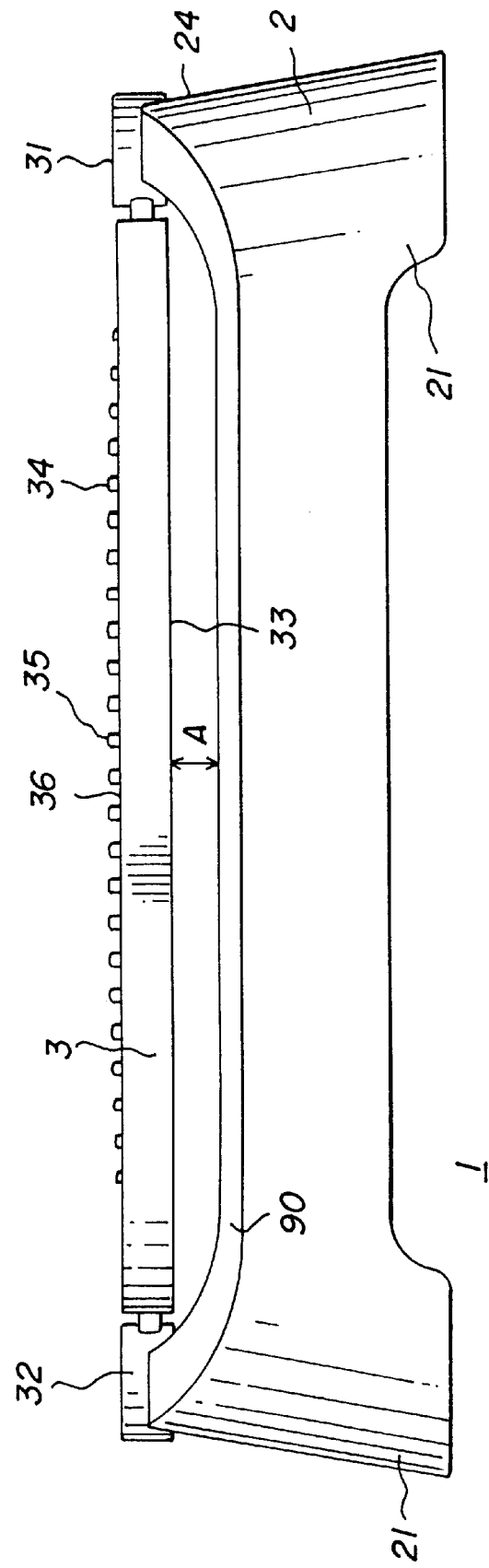
FIG. 5 is a front elevational view depicting the embodiment of FIG. 1 with the grill plate disposed on the base.

FIG. 5 shows a front elevational view of the grill apparatus 1 wherein the grill unit 3 is firmly and removably held on the top of cut-out portion 24 of the base 2. There also is a cut-out or molded part 90 at the top of the front and back walls of the base 2 which are of the distance "A" from the bottom surface of the grill unit 3 held by the base 2 as shown. As shown, the legs 21 are formed at the four corners of the base 2, with opening therebetween for air circulation, which prevents build up of heat within the base. However, the entire base 2 can be level and closed around the bottom surface and to be without legs 21 at the four corners. The distance "A" between between the bottom of grill plate 3 and the top of cut out portion 90 of base 2 is of suitable dimension to allow air circulation and prevent heat building up inside based 2. The grill unit 3 is held on base 2 which is supported for example on a dining table by legs 21, by the left end extension 32 and right end extension 31. One grilling surface 34 comprises an alternating plurality of raised bars 35 and non-raised channels 36 and can form a pattern of stripes, for example, on a cooked piece of meat. The other side surface 33 is a flat surface and can be used, for example to grill pancakes. The right and left end extensions 31,32 are made of suitable plastic and form handles with which to turn over (i.e. reverse the cooking surface) the grill plate 3, in addition to use as a device for anchoring the grill plate 3 onto the base 2. The grill plate 3 itself is made of a metallic material which can conduct and hold heat suitable for cooking.

Figure 6:
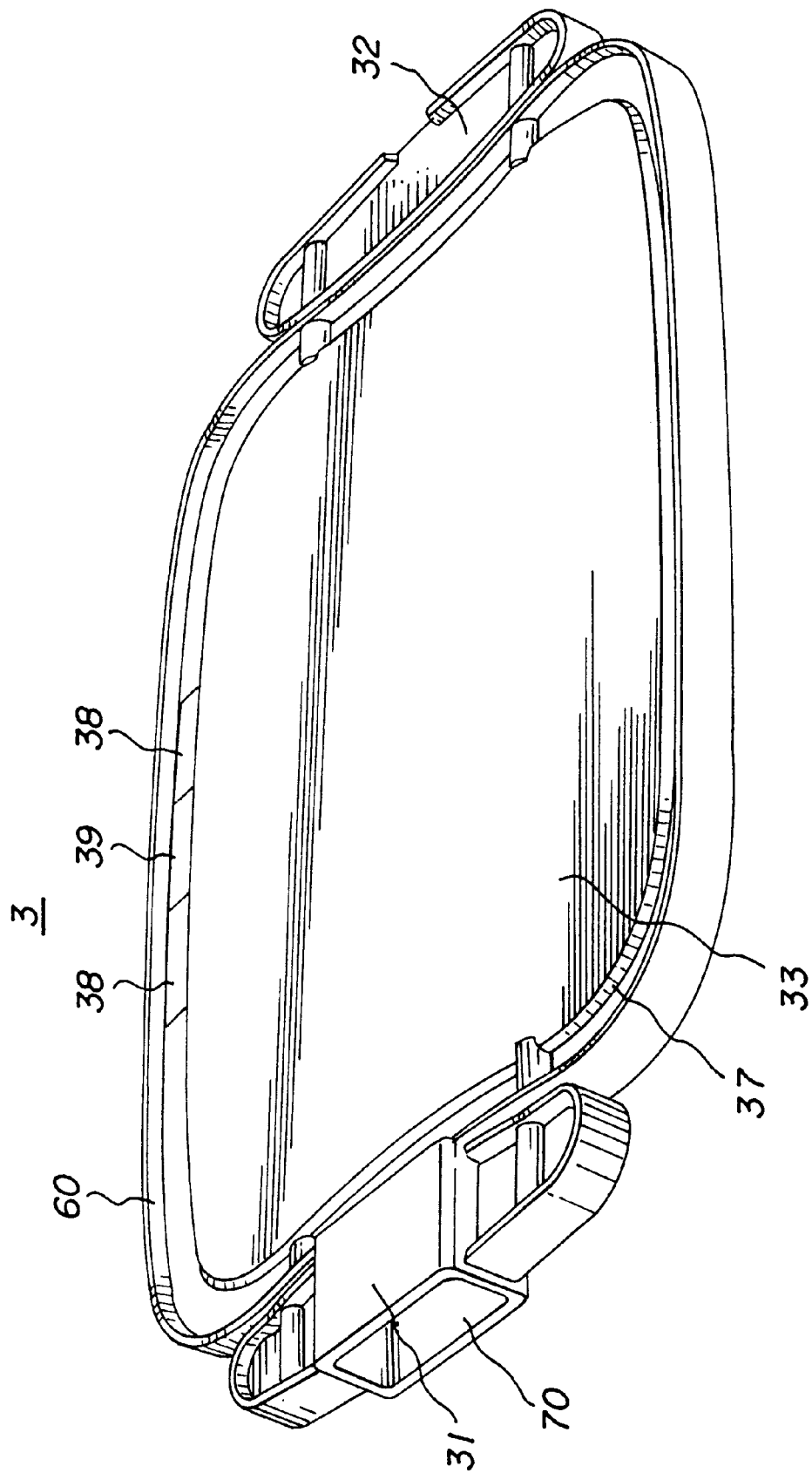
FIG. 6 is a perspective view depicting the flat surface of a grill plate which can be disposed on the base of FIG. 2.

FIG. 6 shows details of the flat surface 33 of the grill plate 3 with right end extension 31 having the electric coupling 70 and the left end extension 32. Around the inside of the periphery wall 60 is a channel 37 into which the fluid from food being cooked on surface 33 is directed. The flat surface may be slightly tilted from a high point (such as 100 for the reverse surface 33 in FIG. 4) at the center thereof to a lower point where it meets the channel 37. At both the front and back toward the center are depressed portions 38 and holes 39 at the center thereof. The depressed portions 38 may be inclined toward the holes 39 to enable better drainage, or alternatively be flat, or even be absent entirely. The fluid collected in channel 37 and depressed portion 38 are led to fall through holes 39 and into pan 4 which is disposed below grill unit 3 disposed within the base 2.

FIG. 7 shows details of the cordoroy surface 34 of the grill plate 3 with right end extension 31 and left end extension 32 extending from the body of the grill plate 3. The extensions 31 and 32 are connected to the grill plate 3 by bars 50 which may be formed as a unified body together with the other parts of the grill plate 3. The grill unit or plate 3 has buried therein an electric heating element using known techniques. The right end extension 31 comprises a box like structure 54 which has the electric coupler 70 therein for connection to an outside line, and a modified circular structure 51 and connecting piece 53. The left end extension 32 also comprises a modified circular structure 51 and a flat connecting piece 52. The cordoroy surface 34 comprises a plurality of raised portions 35 alternating with non-raised channels 36. Around the inside of the periphery wall 60 is a channel 37, in which the fluid from the cooking food will be fed, after being collected through the non-raised channel 36. The fluid will tend to flow to the periphery because the surface 34 is raised slightly at the center (see FIG. 4). After flowing to the periphery channel 37, the fluid will collect in depressed portion 38 and then fall through holes 39 into pan 4 disposed below in base 2. The depressed portion 38 may be inclined toward the holes 39 or alternatively be flat, or even be absent entirely, as desired.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A portable multipurpose cooking apparatus comprising:
   a base consisting of at least one leg, an upright structure extending upward from said at least one leg, a ledge disposed on an inner wall of said upright structure for firmly and removably holding a fluid retaining pan, and an upper surface formed to firmly and removably hold a grill plate thereon;
   said pan having a closed bottom and a lip provide around a top of said pan, said pan being removably held by said lip thereof being disposed on said ledge of said inner wall of said base; and
   said grill plate having a first cordoroy surface on one side thereof and a flat surface on a revere side thereof with a channel on at least two opposite edges of each surface near a periphery thereof for collecting fluid emitted from food being cooked and each said channel on each side having a hole near a center thereof on a back portion and a front portion through which said fluid will fall into said pan disposed below said grill plate, said grill plate having a heating element embedded therein, and wherein said upright structure of said base has a cut-out portion toward said upper surface to provide space between said upper surface and said grill plate.

2. The apparatus of claim 1, wherein said base is made of a plastic material, and said pan is made of a plastic material.

3. The apparatus of claim 1, wherein said cordoroy surface of said grill plate comprises a plurality of raised portions alternating with a plurality of non-raised channels extend from a front of said grill plate to a rear of said grill plate with a slightly raised part toward a center between said front and rear of said grill plate, and flat surface which can be readily reversed so that either surface is used as a cooking surface.

4. The apparatus of claim 1, wherein said flat surface of said grill plate is slanted from a center portion to said front and said rear of said grill plate.

5. The apparatus of claim 1, wherein said grill plate comprises a front, a rear, a left end and a right end, said channel being located toward said front and said rear, and a left extension extending from said left end, and a right extension extending from said right end, said left extension and right extension being disposed on top of said top surface of said base, and wherein one of said left end extension and said right end extension comprises means for connecting said heating element to an electric outlet.

6. The apparatus of claim 5, wherein said grill plate extension and said upper surface of said base are constructed to fit together removably and firmly.

7. The apparatus of claim 1, wherein said lip of said pan and said ledge of said base are constructed to fit together firmly and removably.

* * * * *